United States Patent
Graham et al.

(10) Patent No.: US 7,623,900 B2
(45) Date of Patent: Nov. 24, 2009

(54) METHOD FOR NAVIGATING A VIRTUAL CAMERA ALONG A BIOLOGICAL OBJECT WITH A LUMEN

(75) Inventors: Alan Graham, Edinburgh (GB); Andrew Smout, Edinburgh (GB); Robert A. Davey, Edinburgh (GB); Laurent Lessieux, Edinburgh (GB)

(73) Assignee: Toshiba Medical Visualization Systems Europe, Ltd., Edinburgh (GB)

( * ) Notice: Subject to any disclaimer, the term of this patent is extended or adjusted under 35 U.S.C. 154(b) by 769 days.

(21) Appl. No.: 11/219,632

(22) Filed: Sep. 2, 2005

(65) Prior Publication Data

US 2007/0052724 A1  Mar. 8, 2007

(51) Int. Cl.
*A61B 5/05* (2006.01)
*A61B 1/00* (2006.01)
*G06K 9/00* (2006.01)

(52) U.S. Cl. .................. 600/407; 382/128; 600/103
(58) Field of Classification Search ............... 600/407, 600/103; 382/128; 345/619
See application file for complete search history.

(56) References Cited

U.S. PATENT DOCUMENTS

| | | | |
|---|---|---|---|
| 5,611,025 | A | 3/1997 | Lorensen et al. |
| 5,782,762 | A | 7/1998 | Vining |
| 5,971,767 | A | 10/1999 | Kaufman et al. |
| 6,083,162 | A | 7/2000 | Vining |
| 6,343,936 | B1 | 2/2002 | Kaufman et al. |
| 6,496,188 | B1 | 12/2002 | Deschamps et al. |
| 2003/0108145 | A1 | 6/2003 | Knoplioch et al. |
| 2004/0202990 | A1 | 10/2004 | Geiger |
| 2005/0033114 | A1 | 2/2005 | Geiger et al. |
| 2005/0110791 | A1 | 5/2005 | Krishnamoorthy et al. |
| 2005/0148848 | A1* | 7/2005 | Guang et al. ............ 600/407 |

FOREIGN PATENT DOCUMENTS

WO   03/054803   7/2003

OTHER PUBLICATIONS

Paik David, "Automated Flight Path Planning for Virtual Endoscopy", Medical Physics, AIP, Melville, NY, US, vol. 25, No. 5, May 1998, pp. 629-637.

(Continued)

*Primary Examiner*—Eric F Winakur
*Assistant Examiner*—Katherine L Fernandez
(74) *Attorney, Agent, or Firm*—Renner, Otto, Boisselle & Sklar LLP (57) ABSTRACT

A method of navigating along a biological object with a lumen represented by a three-dimensional volume data set comprises generating a plurality of navigation segments connectable in a sequence, each segment having a start point within the lumen, a direction and a length. The navigation may be used for a camera in a virtual endoscopic examination, for example. The direction of each segment is determined by casting groups of rays outwards from the start point of the segment to the object wall, and calculating an average ray length for each group. The group having the largest average ray length is selected, and the axial direction of this group is used as the direction for the segment. The average ray lengths of the groups may be weighted using the direction of the previous segments to bias the navigation generally forward, or may be weighted using a view direction of the camera to allow a user to turn the camera into a chosen branch in the object.

35 Claims, 5 Drawing Sheets

OTHER PUBLICATIONS

Lin H. et al., "Slice-based Virtual Endoscopy Navigation", IEEE Conference on Information Visualization. International Conference on Computer Visualization and Graphics, 2001, pp. 711-716.

Bartz, Dirk. "Virtual Endoscopy in Research°and Clinical Practice." *Star—State of the Art Report, Eurographics 2003*.

* cited by examiner

METHOD FOR NAVIGATING A VIRTUAL CAMERA ALONG A BIOLOGICAL OBJECT WITH A LUMEN

BACKGROUND OF THE INVENTION

The present invention relates to a method of navigating along a hollow tubular object such as a biological object with a lumen, the object included in a three-dimensional volume data set representing a biological structure.

Patient imaging methods, such as computer-assisted tomography (CT), magnetic resonance imaging (MRI), ultrasound and positron-emission tomography (PET), generate large three-dimensional volume data sets representing all or part of a patient's body. These volume data sets are highly detailed and allow complex studies of the body to be made. Techniques for this include virtual endoscopy, in which a virtual camera is made to travel along a biological object with a lumen such as a colon, blood vessel or bronchial tree, with the image of the lumen that is seen by the camera presented to a user for diagnostic and other purposes. To navigate the lumen, a path for the camera to follow is often determined wholly or partially in advance, since even an experienced clinician may have difficulty in manually controlling the camera movement.

A number of methods have been proposed for controlling the camera and calculating suitable camera paths. A real-time user experience that is at least partly automated is preferred for virtual endoscopy, and important criteria for achieving this include speed, simplicity of computation, and wall avoidance for the camera. It is not generally trivial to satisfy all the criteria, and previously proposed methods are many and varied. Some provide fully automated navigation, in which the entire camera path is calculated in advance, followed by processing to generate the images shown by the camera during its journey. Other methods calculate a navigation direction and associated camera images a little at a time. This approach offers some user interaction as the camera progresses along the lumen but it is more difficult to give a high-quality real-time viewing experience owing to the time needed to produce the images.

Published methods for automated or semi-automated navigation include those based on mathematical techniques designed for wall avoidance in generating a path from a start point to an end point [1, 2]; those based on mathematical techniques that use erosion to determine a centerline along the lumen [3]; labeling points in the data set with their distance from the end of the path using a wavefront model to avoid obstacles and calculating the path by moving from point to point according to the closest distance to the end point [4]; obtaining an initial path by using a distance label map to connect start and end voxels in the data set via intermediate voxels according to their distance from the start and end voxels, and then centering the path using maximum diameter spheres [5, 9]; and determining navigation steps by using ray casting to find the longest ray from a camera position to the wall and weighting this with the existing viewing direction of the camera to obtain a new direction for movement of the camera, and repeating this for each step [6].

General data collection and processing methods for viewing three-dimensional patient images have also been described [7, 8], including virtual endoscopy in which the user navigates using a computer mouse or in which the user's viewpoint is automatically moved through the data set along the centerline of a lumen. The centerline is determined using erosion or by calculating the centers of a series of planes of minimum area dissecting the lumen.

A number of commercial virtual endoscopy systems and the various approaches taken to camera navigation and to the image processing necessary to represent a realistic view of the lumen are discussed by Bartz [10].

The present invention seeks to provide an alternative method for navigating a lumen, such as for navigation of a virtual endoscopy camera.

SUMMARY OF THE INVENTION

Accordingly, a first aspect of the present invention is directed to a computer-implemented method of navigating along a hollow tubular object bounded by a wall and represented by a three-dimensional volume data set, the data set comprising a plurality of voxels arranged in a three-dimensional array, the method comprising: generating a plurality of navigation segments connectable in a sequence, each segment having a start point within the object, a direction and a length; the direction of each segment being determined by: calculating an average ray length for each of two or more groups of rays cast from the start point of the segment, each group comprising a plurality of rays arranged about a central axis, and each ray extending from the start point to the wall; selecting the group with the largest average ray length; and setting the direction of the segment to the direction of the central axis of the selected group.

Navigation performed in accordance with this method will generally avoid the wall of the object, and hence be useful for a range of applications. For example, virtual endoscopy requires navigation for a virtual camera that stays close to the centerline of the object, both to give a good field of view and to avoid giving a user the impression that the camera is about to collide with the object wall. The wall avoidance is achieved by using the direction of a group of rays with the longest average ray length out of a number of groups of rays as the segment direction for the next navigation segment. Selection of the longest individual ray from the segment start point gives a navigation direction generally along the length of the object, but which tends to pass very close to the wall at bends. Replacing this with an average length from the selected group of rays tends to bias the navigation direction away from the wall and towards the centerline, to give an improved navigation. A group of rays having an axial direction that passes close to the object wall at a bend will have a reduced average length (because some rays will meet the wall before the bend and hence be short) compared to a group with an axial direction closer to the centerline. Thus the latter group will be selected to give the segment direction, keeping the navigation near to the centreline.

The plurality of rays in each group may be cast within a solid angle. Using ray groups that cover a volume, rather than a flat arrangement of rays cast in a single plane, takes better account of the three-dimensional nature of the object, which may bend in any direction. Using planar ray groups in a variety of differently oriented planes may also give a satisfactory result. For solid angle ray groups, different shapes of group may be used, but good results can be obtained if the plurality of rays in each group are cast within a cone.

In some embodiments, the method may further comprise, for each navigation segment: defining a surface within the data set that encloses the start point; dividing the surface into a plurality of pixels; and for each pixel, casting a ray in the direction of the pixel from the start point to the wall and allocating to the pixel a value representing the length of the ray; and calculating an average ray length for a group of rays comprises: selecting a group of adjacent pixels arranged about a central pixel; and calculating the average pixel value for the group of pixels; where the average pixel value for the group of pixels corresponds to the average ray length of the group of rays, and the direction of the central pixel from the start point corresponds to the direction of the central axis of the group of rays. Constructing such a "distance map" using the surface of a volume encompassing the start point gives a useful tool for calculating the average ray lengths for a plurality of ray groups. In effect, the distance map provides a record of the lengths of a plurality of individual rays cast from the start point in a form that can conveniently be used to calculate average lengths. A group of pixels corresponds to a group of rays, and since the individual rays are cast in advance and recorded, there is no need to repeatedly cast particular rays that are included in more than one group. This is therefore an efficient way of calculating the average lengths for many groups.

The surface may be the surface of a cube comprising six square faces. A distance map in the form of a cube has been found to be computationally efficient while at the same time giving a suitably high quality navigation with regard to object wall avoidance. However, other surfaces may be used, such as a sphere or a dodecahedron.

The groups of pixels may be selected according to the desired size and shape of the ray groups. For example, a group of adjacent pixels arranged in a circle approximates to a group of rays cast within a cone.

Furthermore, each face of the cube may be extended past the edges of the cube by adding pixels with values that match the values of pixels in proximate regions of the adjacent faces, to accommodate groups of pixels with central pixels near the edge of a face. This allows pixel groups to cross cube faces without introducing additional computational complexity when using the surface to compute average ray lengths.

In some embodiments, the average ray length may be a weighted average ray length. For example, the average ray length may be weighted with the dot product of a vector describing the direction of the central axis of the group of rays and a vector derived from the direction of one or more previous navigation segments in the sequence. This weighting acts to favour directions that are generally forwards with respect to the existing navigation direction. This helps to avoid sudden undesirable reverses or turns in the navigation in the event that the longest average ray length arises from a branch in the object or a long straight portion of the object that has just been traversed.

Also, if the navigation segments are used to navigate a virtual camera along the object, the camera having a view direction, the average ray length may be weighted with the dot product of a vector describing the central axis of the group of rays and a vector describing the view direction of the camera. If the camera approaches a branch in the object and the user uses the camera to look along the branch, this weighting allows the user to direct the camera along the branch if it appears of interest.

Alternatively, if the navigation segments are used to navigate a virtual camera along the object, the camera having a view direction, the method may further comprise, after calculating the weighted average ray length for each group of rays, calculating a score for each group of rays based on the weighted average ray length and on the direction of the central axis relative to the direction of a previous navigation segment and to a previous or current viewing direction, wherein selecting the group with the largest average ray length comprises selecting the group with the best score.

To use the navigation for virtual endoscopy, the method may further comprise causing a virtual camera to travel along the navigation segments in sequence such that an image of the interior of the object from a point of view of the travelling camera is displayed to a user. One or more navigation segments may be generated ahead of a current position of the camera. This option allows for various elements of user interactivity, such as camera adjustment and direction selection, without large amounts of advance processing being wasted in the event that the generated segments are not followed or a default camera view not used.

If the directions of two navigation segments are found to have an angular difference that exceeds a specified threshold, one or more intermediate navigation segments may be generated by interpolating between the two navigation segments, and inserted in sequence between the two navigation segments to reduce the rate of angular change. This addresses potential problems when the navigation follows a bend in the object and the camera rotates as it traverses the bend. For a sharp bend, the camera may be required to rotate quickly through a large angle as it moves from one segment to another, which results in an inferior image of the object being presented to the user. Adding extra segments can smooth the corners so that the camera can rotate more gradually as it travels around the bend.

In some embodiments, for at least some navigation segments, the camera may have a view direction which is described by the direction of the navigation segment along which the camera is travelling. This can be set as a default configuration, since it gives a user a good practical view of the object interior without any user interaction being required.

Alternatively, for at least some navigation segments, the camera may have a view direction interpolated from the direction of the navigation segment along which the camera is travelling and the direction of a navigation segment ahead of the navigation segment along which the camera is travelling. This also addresses the issue of camera rotation around bends in the object. Directional information from a future segment can be used to adjust the camera view direction somewhat towards the direction of the future segment in advance of the camera reaching that segment, so that the camera does not have to swing through such a large angle when it reaches that segment. Again, the camera rotates more gradually as it travels around a bend, giving an improved view to the user. The view direction of the camera may be rotated towards the interpolated direction as the camera travels along the navigation segment. This further smoothes the camera rotation.

Also, the camera may have a view direction that can be rotated by a user. This offers a useful level of user interactivity, in that the user can choose to look directly at any particular features of interest found in the object. Attention can therefore be focussed where most needed, to give an improved patient diagnosis for example. Additionally, the rotational freedom can be used to allow the user to control the navigation direction if desired. A navigation segment can be selected by a user to have a direction substantially along the view direction of the camera. For the selected navigation segment, the method may further comprise weighting the average ray length for each group of rays with the dot product of a vector describing the central axis of the group of rays and a vector describing the view direction of the camera, before selecting the group with the largest weighted average ray length.

In some embodiments, the method may further comprise displaying to a user a reference view of the object including an indication of the current camera position. This may be useful to aid the user in orienting within the object and seeing how much more of the object may need to be viewed, and to show the approach of any branches in the object down which it may be desirable to travel. The reference view may further include a representation of one or more navigation segments.

Also, the reference view may further include, at a branch in the object, representations of navigation segments with different directions between which a user can choose.

The image of the interior of the object displayed to the user may include an indication of the direction of travel of the camera. This is further useful to aid user orientation, since the user can be made aware of differences between the direction of navigation and the camera view direction.

The camera may travel at a velocity that can be adjusted by a user. This further contributes to user interaction, allowing the user to travel slowly through regions of the object of most interest to obtain a better view, and to travel quickly through parts of the object of little or no interest, thus allowing an endoscopic examination to be performed more rapidly.

The method may further comprise, for at least one navigation segment, adjusting the start point towards the central longitudinal axis of the object. Depending on the segments to which this is applied, this can be used to improve centering of the camera throughout the navigation, or in specific regions such as bends in the object. Alternatively, it may be done only for the start point of the first navigation segment, since this will probably be selected by a user, for example by pointing and clicking with a mouse on a displayed cross-sectional image of the object, and may therefore be poorly positioned with respect to the centerline. For embodiments using a distance map, the method may further comprise, for at least one navigation segment, adjusting the start point towards the central longitudinal axis of the object using the values of the pixels on the surface.

In some embodiments, the three-dimensional volume data set may be a time-evolving three-dimensional volume data set so that the navigation traverses the object in space and time. The method of the present invention is of particular benefit for such data sets (four-dimensional data sets, representing a beating heart for example) since the navigation is performed independently from any end point, and can be used for a virtual camera while it is still being calculated. Hence relative movement in time of parts of the object for which segments are not yet generated is of no consequence. This is not true of those previously proposed path finding techniques in which a path must be generated in its entirety before the camera can begin its passage, or those techniques that rely on a specified end point fixed within the data set.

For other applications, however, a path generated wholly in advance can be useful. Therefore, the method may further comprise connecting the navigation segments in sequence to create a path through the object. To perform virtual endoscopy based on this approach, therefore, the method may further comprise, after creating the path, causing a virtual camera to travel along the path such that an image of the interior of the object from a point of view of the travelling camera is displayed to a user. Alternatively, the method may further comprise using the path for a purpose other than navigation of a virtual camera.

The hollow tubular object may be a biological object with a lumen.

A second aspect of the present invention is directed to a computer program product comprising machine-readable instructions for implementing a computer-implemented method of navigating along a hollow tubular object bounded by a wall and represented by a three-dimensional volume data set, the data set comprising a plurality of voxels arranged in a three-dimensional array, the instructions being operable to instruct a machine to: store a three-dimensional volume data set; and generate a plurality of navigation segments connectable in a sequence, each segment having a start point within the object, a direction and a length; the direction of each segment being determined by: calculating an average ray length for each of two or more groups of rays cast from the start point of the segment, each group comprising a plurality of rays arranged about a central axis, and each ray extending from the start point to the wall; selecting the group with the largest average ray length; and setting the direction of the segment to the direction of the central axis of the selected group.

The computer program product may comprise a computer program on a carrier medium. For example, the carrier medium may be a storage medium or a transmission medium.

A third aspect of the present invention is directed to a computer system for implementing a computer-implemented method of navigating along a hollow tubular object bounded by a wall and represented by a three-dimensional volume data set, the data set comprising a plurality of voxels arranged in a three-dimensional array, the computer system comprising: memory for storing a three-dimensional volume data set; and a processor programmed to: generate a plurality of navigation segments connectable in a sequence, each segment having a start point within the object, a direction and a length; the direction of each segment being determined by: calculating an average ray length for each of two or more groups of rays cast from the start point of the segment, each group comprising a plurality of rays arranged about a central axis, and each ray extending from the start point to the wall; selecting the group with the largest average ray length; and setting the direction of the segment to the direction of the central axis of the selected group.

Other examples and embodiments are set out in the accompanying claims.

BRIEF DESCRIPTION OF THE DRAWINGS

For a better understanding of the invention and to show how the same may be carried into effect reference is now made by way of example to the accompanying drawings in which.

DETAILED DESCRIPTION

Medical imaging techniques such as computer-assisted tomography (CT), magnetic resonance imaging (MRI), ultrasound and positron-emission tomography (PET) produce large sets of data representing all or part of a patient's body. The data are typically collected in slices or layers through the patient's body, which are then assembled into a three-dimensional volume data set. The data set comprises a plurality of volume elements or voxels, arranged in a regular three-dimensional array. Each voxel has a value associated with a physical property (expressed in Hounsfield units, for example) that indicates the characteristics of the tissue in the corresponding part of the patient. Thus, voxels representing bone will have different values from voxels representing organs or muscles. Volume rendering, surface rendering or other image processing methods can be used to generate two-, three- or four-dimensional images of the patient from any viewpoint inside the data set.

One particularly useful technique relating to viewing of the data set is virtual endoscopy. This simulates the medical procedure of putting a camera connected to optical fibers into a patient to relay to medical staff an internal view of the colon, the bronchial tree or other hollow tubular object or lumen in the body. This invasive procedure is uncomfortable for the patient, who generally needs sedation or anesthesia. By contrast, a volume data set can be collected with little or no discomfort to the patient, and virtual endoscopy offers the opportunity to study any object with a lumen in the body whether or not it is accessible via actual endoscopy.

To perform virtual endoscopy it is necessary to control the virtual camera as it travels through the data set. Complete manual control is generally unsatisfactory, so data processing techniques are used to automatically or semi-automatically navigate the camera through the object of interest. This is commonly referred to as "fly through", since the camera effectively flies through the data set, relaying images to the user en route. The camera has a view point and a view direction (for example, along the direction of navigation) with respect to which images of the lumen are generated (by volume rendering, for example) and displayed to the user to simulate the view from a standard endoscope camera. Control of the camera is a non-trivial problem; any processing should desirably be very fast so as to deliver an acceptable real-time viewing experience to the user.

A possible approach to the navigation problem is to calculate a series or sequence of steps navigating short segments of the lumen that connected together generate fly-through. Beginning from a start point specified inside the lumen, this might be achieved, for example, by finding the direction of the furthest point in the lumen that is visible from the start point in the general view direction, moving the camera from the start point part or all of the way along this direction, then finding the direction of the furthest point visible from the new camera position in the general view direction, and so on.

Figure 1:
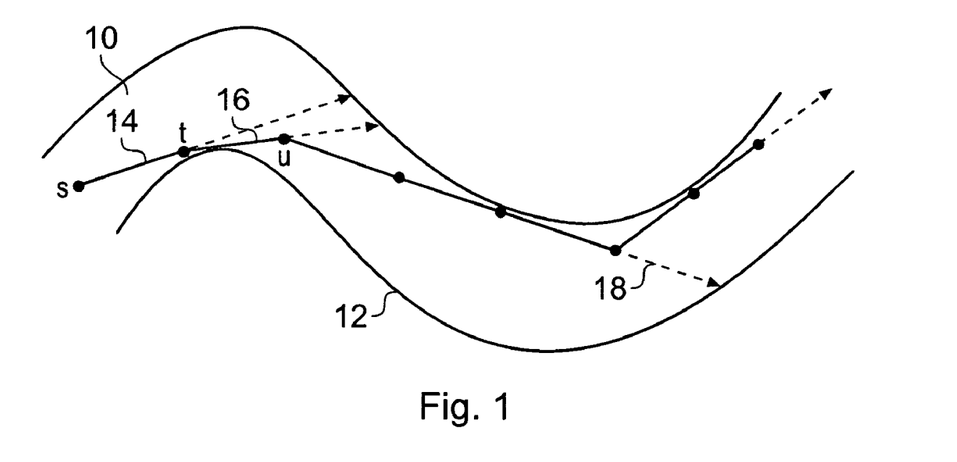
FIG. 1 shows a cross-sectional representation of simple biological object with a lumen through which navigation is performed using a furthest visible point technique.

FIG. 1 illustrates this situation. An object with a lumen 10, bounded by a wall 12, is shown in schematic cross-section. From a start point s, a first navigation segment follows the line 14 that points towards the furthest point in the lumen visible from s. At a point t along the line 14, positioned somewhat short of the furthest point from s, a new furthest point is determined, giving a second navigation segment that follows the line 16 pointing to the new furthest point. Third, fourth and fifth segments follow the line 18 determined in a similar way from a point u somewhat short of the furthest point from t.

A problem with this approach is that the navigation algorithm finds the shortest route around corners in the lumen, which takes the camera very close to, or into collision with, the object wall. This is both disconcerting for the user and unhelpful from a clinical perspective since the camera cannot show a good clear image across the width of the lumen. It is preferable for the camera to travel closer to the center of the lumen, with the camera view direction biased towards the direction of travel so that the camera is looking along the lumen and provides a reasonable field of view.

Figure 2:
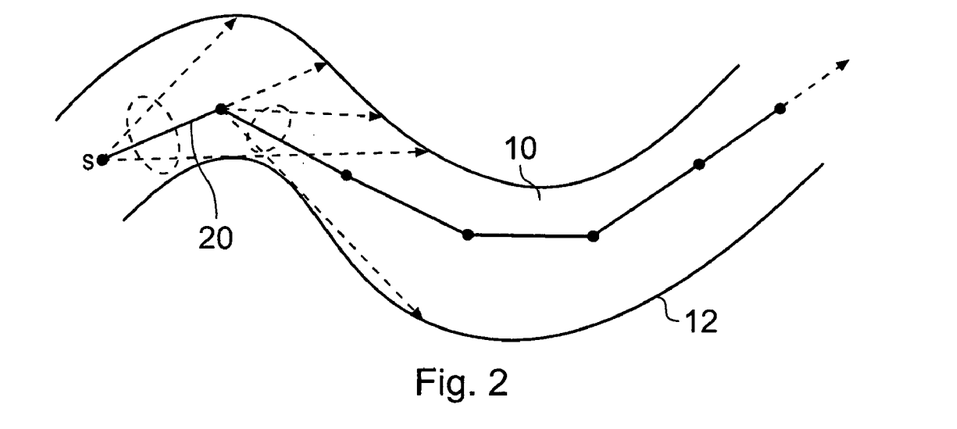
FIG. 2 shows the object of FIG. 1 through which navigation is performed in accordance with an embodiment of the present invention.

The present invention proposes a method of defining a direction along which a camera can navigate which avoids the wall of the lumen. FIG. 2 shows the object 10 of FIG. 1 with a more preferable navigation direction 20 that lies close to the center of the lumen 10 and avoids the object wall 12 determined in accordance with an embodiment of this method.

The proposed method uses the technique of ray casting or ray projection, in which an imaginary line or ray is projected outwards from a point within a three-dimensional data set. The ray passes through voxels in the data set, and the assigned values of the voxels are added up until the accumulated value exceeds a predefined threshold, at which point the ray is halted. Alternatively the ray may pass through the voxels until it reaches an individual voxel with an assigned value that exceeds or falls below a predefined threshold, when again the ray is halted. Segmentation of the data set can also be performed, in which case the ray is halted when it reaches a segmented voxel. In each case, the ray then has a particular length within the data set.

In the case of an anatomical object with a lumen, the voxels of the lumen can be assigned low values, and the voxels corresponding to the object wall higher values. Thus, a ray cast from a point in the lumen can be made to halt when it reaches the object wall, so that the distance from the ray start point to the wall can be determined. Recalling the example of FIG. 1, the various segments can be found by casting rays from a point and finding the longest ray, which will extend from the point to the furthest part of the wall visible from that point. However, as explained, this gives camera motion that grazes the object wall, which is undesirable.

According to the present invention, the navigation instead comprises a series of steps or segments, the direction of each of which is found using the average lengths of groups of rays cast from a point at the start of the segment, rather than using single rays cast from the point. For a first navigation segment having a specified start point within the lumen, a number of groups of rays is cast from the start point to the object wall. Each group comprises a plurality of rays cast from the start point within a solid angle so that each group of rays radiates outwards over a substantially equal volume within the data set. The average ray length for each group is calculated, and the group having the longest average length is selected. The central longitudinal axis of the volume occupied by that group of rays is then specified to be the direction for the first segment. A segment length is specified also, so that the segment extends in the specified direction over that length from the start point to an end point. The end point is then taken to be the start point for a second segment, a plurality of groups of rays is cast from the second start point and the group with the longest average length is selected for the direction, and so on.

Figure 3A:
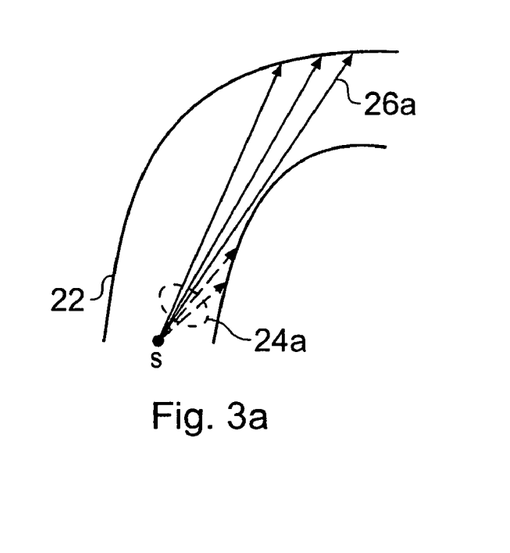
FIGS. 3A and 3B show cross-sectional representations of part of a lumen in which groups of rays have been cast from a start point in accordance with embodiments of the invention.
Figure 3B:
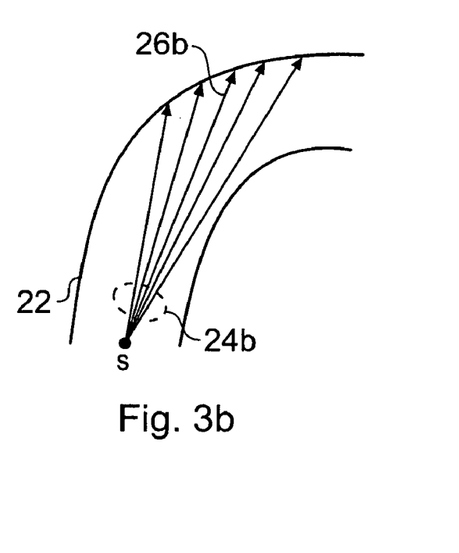

FIGS. 3A and 3B illustrate how this method operates to improve the navigation direction. Both Figures show a section of a lumen 22 that includes a bend. In FIG. 3A, a group of five rays 24a is projected from a start point s. The central ray 26a, corresponding to the axis of the group, extends to the furthest point visible from the start point, so that if this group was chosen for the segment direction, the camera would follow the ray 26a and hence skim the object wall at the inside of the bend. However, although the group 24a includes the furthest ray, the rays close to the inside of the bend in the lumen are much shorter than the furthest ray, so that the average ray length is relatively small. In FIG. 3B, a second group of five rays 24b is projected from the start point s, directed more towards the outside of the bend. In this case, none of the rays is cut short by being close to the inside of the bend so that the average ray length is much higher than for the group 24a. Therefore, this second ray group 24b would be selected over the group 24a to define the segment direction. The central axial ray 26b corresponds to the segment direction. As can be seen from the Figures, this direction is much closer to the center of the lumen than the direction indicated by the ray group 24a, and avoids the object wall. Thus, the effect of using the longest average ray length of a plurality of ray groups is to bias the navigation direction away from the wall, and towards a more beneficial position for providing a desirable field of view for the virtual camera. Note that although FIGS. 3A and 3B necessarily show planar groups of rays, since they are cross-sectional views, the ray groups are in reality cast within a solid angle so that they occupy a three-dimensional volume. This takes account of the three-dimensional nature of an object, in which bends and curves can occur in any direction.

When navigating in this way, the segments can be set so that all have the same length. Alternatively, the segment length may vary. For example, the segment length may be shorter around bends, to slow the camera movement down to give a more natural-looking simulation or stay closer to the center of the lumen. Alternatively, the segment length may be determined by setting the end point for each segment to be placed a certain distance from the object wall. This also avoids the wall around bends but allows individual segments to cover long distances along straight parts of the lumen, which reduces the amount of computation. The speed of the camera during navigation may also be related to the segment length. The camera speed may be set constant and thus be unrelated to the segment length, or it may be set so that a constant time period is assigned for travel of each segment. For equal segment lengths this will give a constant camera speed, but if shorter segments are used around bends, the camera will be slowed as it moves around corners. This is desirable as it gives a smoother viewing experience and gives the user a better opportunity to observe the lumen interior when the view ahead is blocked by a bend.

When projecting the rays, any pattern radiating out from the start point can be used. It has been found that a good ray length averaging result is given if the rays occupy a circular cone, so the rays are cast evenly around the central axis and the solid angle within which the rays are cast subtends a circle. However, other shapes may also be used, such as an elliptical cone, or a triangular or square pyramid, or solid angle subtending other polygons. Irregular shapes may be found suitable in some cases. The choice of shape may depend on ease of implementation.

An embodiment of the present invention proposes a useful tool for calculating the average ray length of the ray groups. The tool aims to facilitate the calculation by removing the need to separately cast a ray and determine the ray length for every ray in every group, which is a simple but time-consuming approach since an individual ray may appear in more than one group if the groups overlap. For convenience, the tool will be referred to as a "distance cube map". The term "cube map" is used in the field of computational graphics, where cube map texturing is a form of texture mapping that uses a three-dimensional direction vector to index into a texture that is six square two-dimensional textures arranged like the faces of a cube. However, the distance cube map is a different entity.

The distance cube map is a set of six square "images" arranged as a cube. The cube is centered on a point selected from within a three-dimensional data set. Each face of the cube, or image, is made up of a grid of pixels, each pixel having a value. The value is determined by casting a ray from the center of the cube in the direction of the pixel and on until the accumulated values of the voxels through which the ray passes exceed a specified threshold for the distance cube map, or until the ray reaches an individual voxel with a value exceeding a specified threshold. The length of the ray is used as the value of the pixel. In the context of the present invention, a distance cube map is generated for each navigation segment. The central point of the cube is the start point s for the segment, and the voxel value threshold is set so that the ray length reflects the distance from the start point to the object wall. Therefore, the distance cube map represents the lengths of a plurality of rays cast out in all directions from the start point to the object wall, this being the information needed to calculate the average ray length for the ray groups.

Figure 4:
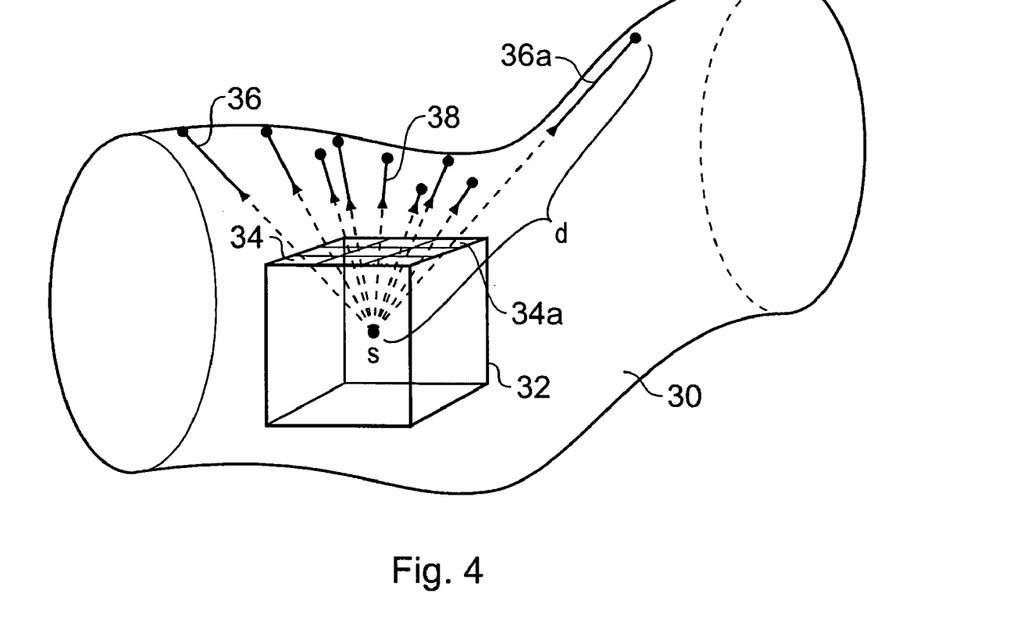
FIG. 4 shows a representation of part of a lumen in which a distance cube map has been defined in accordance with embodiments of the invention.

FIG. 4 shows a schematic representation of a simple distance cube map. A start point s is located inside a lumen 30. A cube 32 is defined within the three-dimensional space of the volume data set, centered on the start point s. The upper face of the cube 32 is divided into nine pixels 34 (three by three array). Rays 36 are cast out from the start point s, one through each pixel 34, until they reach the wall 38 of the lumen 30. Then, each pixel is given a value representing the length of the corresponding ray. For example, the ray 36a has a length d; this is the value allocated to the pixel 34a. For ease of illustration, rays and pixels are shown for the upper face of the cube 32 only, but it is to be understood that each face of the cube 32 is divided into pixels, through which rays are cast. Similarly, only nine pixels are shown for the upper face. In reality, a large quantity of pixels will probably be required. The quantity used will depend on factors such as the speed of computation required to determine the navigation. A large amount of pixels will generally give a more accurate result, but will be more computationally expensive.

To determine the segment direction using the distance cube map, each pixel on each cube face is considered in turn. Using the example of rays cast within a cone, the pixel under consideration represents the central axis of the cone, and pixels surrounding this central pixel that lie within an approximate circle are selected. This is equivalent to casting a cone of rays out from the central point of the cube. The average value of all the pixels within the circle is calculated; this gives the average ray length for the cone, which is then recorded and associated with the position of the central pixel. This is repeated for every pixel on the cube, to give average ray lengths for a plurality of groups of rays. The largest average length is identified, and the location of its associated pixel then gives the segment direction, where the direction is along a line joining the center of the cube (start point of the segment) to the pixel. The direction and the specified length for the segment determine the end point for that segment, which is taken as the start point for the next segment about which a new distance cube map is generated and the process repeated to find the direction of the next segment.

Figure 5:
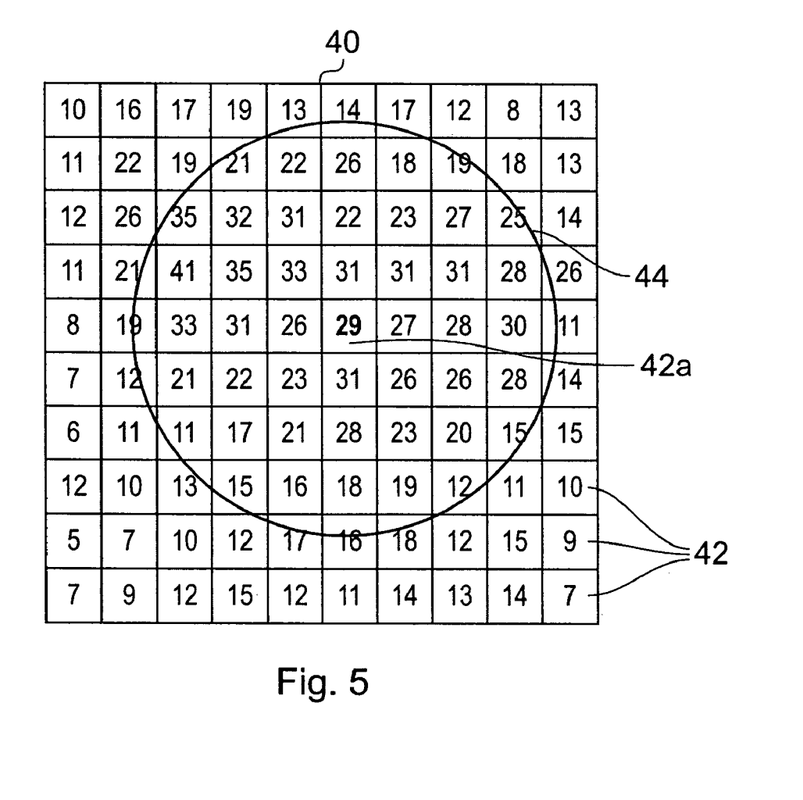
FIG. 5 shows a representation of the use of a face of a distance cube map to cast a group of rays.

FIG. 5 shows a schematic representation of part of this process for a single conical ray group. A single face 40 of a cube is shown, divided into a ten by ten array of a hundred pixels 42, each with a value. For a specific pixel 42a, a circle 44 centered on this pixel encompasses thirty-seven pixels 42, corresponding to thirty-seven rays. These pixels have a total value of 974, and hence an average value of 26.3. This average value is associated with the direction defined by the central pixel 42a, for comparison with the average values of other ray/pixel groups. For rays cast in shapes other than a cone, the process is analogous, with a group of pixels being selected that corresponds to the cross-sectional shape of the ray group and is centered on a particular axial pixel.

The example shown in FIG. 5 is straightforward in that the circle of pixels does not extend beyond the edges of the face of the cube. However, for ray groups centered on pixels near the edge of a face, this is not the case. To handle this situation, it is proposed that for each face of the cube the distance image is extended past the edges of the cube by adding on parts of the adjacent faces. This may be thought of as unfolding the cube to give a large enough flat surface to accommodate the whole of a pixel group centered near the edge.

Figure 6:
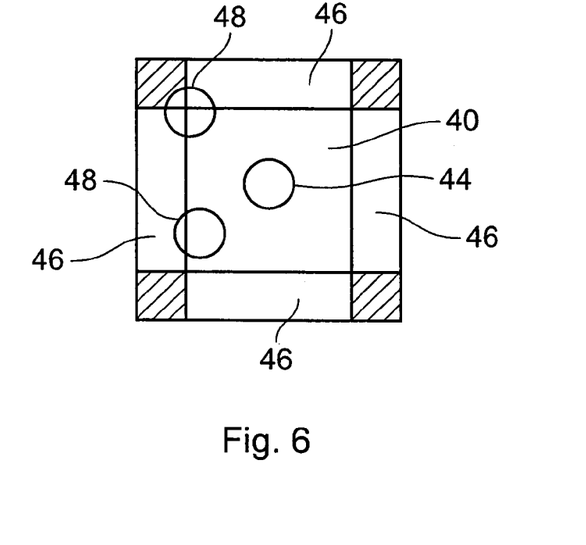
FIG. 6 shows a representation of a face of a distance cube map extended in accordance with an embodiment of the invention.

FIG. 6 shows a representation of a face of a cube extended in this way. The pixel image area available now includes the whole of the face 40 plus small amounts of the adjacent faces 46. This allows a circle 48 (or other shape) that overlaps an edge or a corner of the cube to be processed in the same way as a circle 44 completely contained on a single face. The hatched areas, which are not "filled in" by unfolding the cube, are excluded from the calculation since they contain no pixels.

While the distance cube map is considered to be an advantageous way of distributing the rays and calculating the average ray lengths, this embodiment is not so limited. The distance cube map concept can be extended to provide distance maps on the surfaces of other polyhedrons centered on or otherwise enclosing the segment start point, such as a dodecahedron or a icosahedron. Alternatively, one may calculate a uniform distribution over the surface of a sphere centered on the segment start point. This is a complex task, but the sphere could be calculated once and stored in a look-up table for repeated use. These various options are attractive in that they permit a more even distribution of rays, leading to an improved average value, but are computationally more complex that the distance cube map.

Calculating the navigation in the manner described thus far gives a useable camera navigation direction, but embodiments of the invention propose various weightings of the rays and segment directions to give an improved result.

In one embodiment, the rays within each individual group are weighted when the average ray length is calculated. For example, an increased weight may be given to the rays near to the axis, i.e. the values of the pixels near the center pixel of the group are increased. This may be advantageous for narrow regions of the lumen where only a small number of the central rays in the ray group have significant lengths.

In other examples, for each ray group, one may calculate the dot product of a vector describing the direction of the axis of the group and a vector describing the direction of the previous navigation segment, and use the result, either directly or via a proportional amount, to weight the average ray length for the group. The nature of a dot product means that ray groups pointing generally in the same direction as the previous segment are given a higher weight than ray groups pointing more orthogonally to the previous segment, while ray groups pointing more than 90 degrees away from the previous direction receive a negative weighting. This has the effect of favoring ray groups that are directed in a similar direction to the existing direction of travel of the camera, to keep the camera moving in a generally forward direction and avoid sudden reverses in direction that may otherwise occur when the camera approaches a bend after a relatively straight section of lumen, and sudden turns down branches in the lumen. This approach may be extended by using the directions of two or more previous navigation segments to derive a vector, and using this vector for the dot product calculation. This gives a weighting that takes account of more of the earlier navigation, and may give smoother camera travel, for example.

In some cases, though, the user may wish to travel down a particular branch in the lumen rather than continuing in a generally forward direction. In some embodiments, discussed further below, it is proposed that the user be able to rotate the camera viewing direction during travel, instead of the viewing direction being maintained largely along the direction of travel. In such embodiments, navigation down a branch of the user's choice can be accomplished by weighting the average ray length for each ray group with the dot product of the axial ray direction and the current camera viewing direction. If the user has rotated the camera to look along the branch of choice, weighting using the viewing direction favors ray groups that are directed along the branch over ray groups directed generally forward with respect to the travel direction (direction of the previous navigation segment), so that the camera turns into the lumen branch.

Figure 7A:
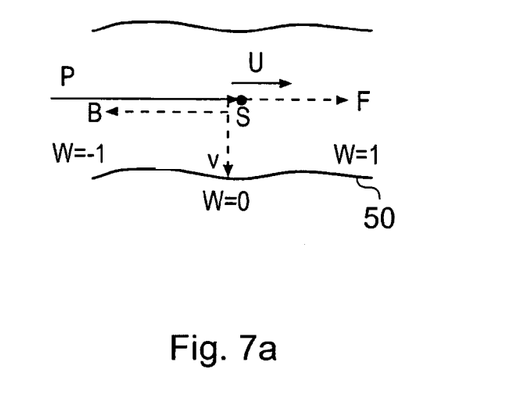
FIGS. 7A and 7B show cross-sectional representations of parts of lumens in which navigation is being performed using weighting techniques according to embodiments of the invention.

FIGS. 7A and 7B illustrate these two latter weighting options. In FIG. 7A, a camera is travelling in a forward direction along a generally straight part of a lumen 50. The most recent navigation segment P terminates at a point s, to be the start point for the next segment. Three possible directions (out of many possibilities) for the next navigation segment are the desirable forward direction F, and the undesirable backwards direction B and sideways direction V that leads to the object wall. A unit vector u is defined, starting at s and having the same forward direction as P. If one then defines a unit vector (for example) describing each of the F, B and V directions, the dot products of these vectors with u give a weighting factor w of 1 for the forward direction, 0 for the sideways direction and −1 for the backwards direction. Directions between these three examples will have values between −1 and 1 in accordance with the cosine nature of the dot product. Applying the weighting factors to the average ray length for each ray group clearly weights forward pointing ray groups over sideways and backwards pointing ray groups so that the largest weighted average ray length will correspond to a generally forward direction.

Figure 7B:
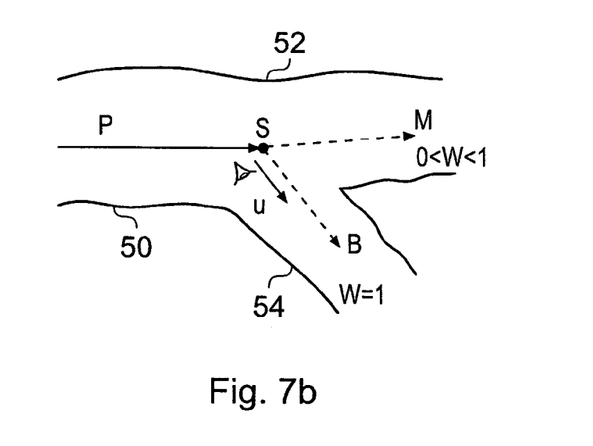

In FIG. 7B, the camera has reached a branch, where the lumen 50 divides into a main branch 52 that continues generally forward and a side branch 54 to the right. On reaching the point s, the user rotates the camera to look along the side branch 54 (indicated by the eye symbol), and indicates to the virtual endoscopy system that he wishes to travel along the branch. A unit vector u describing the viewing direction is defined, and used to calculate weighting factors for the various possible navigation directions. Again using dot products of the vector u with unit vectors describing these directions, the direction B along the side branch receives a weighting factor w of 1, whereas the direction M along the main branch receives a smaller weighting factor of between 0 and 1. Hence the direction of the next navigation segment starting at s is biased away from the main branch and towards the side branch.

Other weighting options for the average ray length are also feasible, and can be applied to exert control over the navigation in various ways. Also, the directions of one or more previous segments and/or the current or previous camera viewing direction can be utilised to influence the navigation in ways other than the dot product techniques described above. For example, one or more of these directions can be used to calculate a score for each group of rays, where the score is a rating for the group that reflects the suitability of its central axis direction to be selected as the segment direction according to chosen criteria for the navigation. The criteria may include factors such as centering the segment within the lumen, travelling in a forward direction only, selecting main branches in the lumen over side branches or vice versa, or moving the camera closer to a feature of interest in the lumen. The score calculation may include the average ray length for the ray group, or a weighted version thereof, or the score may be applied to the average ray length as a weighting factor to give a final score for that group. However the score is determined, the result is a score for each ray group, and the selection of a ray group to indicate the direction of the navigation segment being generated is made by selecting the ray group with the "best score", i.e. the score that indicates a best match with the chosen criteria for the navigation.

Although the various embodiments of the average ray length technique for navigation described thus far operate by biasing the navigation direction away from the object wall and hence towards the center of the lumen, it may be desirable for the camera to be actively repositioned on or close to the lumen centerline. This might be done for every segment along the whole length of the lumen, or for a subset of the segments, either regularly spaced or perhaps limited to regions such as bends and branches in the lumen, or perhaps just once, to center the initial starting point for the camera motion selected by a user. Camera centering is a common task in virtual endoscopy, since centerline paths are often preferred and many techniques do not find the centerline path directly. Any centering method may be applied to the present invention. However, one may make use of the distance cube map described above to perform centering; this is computationally efficient if a distance cube map is used for the segment generation since it will already have been generated.

To center a particular navigation segment, a distance cube map is generated about the start point s and used to determine the direction for that segment by finding the direction of the ray group with the longest average ray length. Then, pairs of rays with opposing directions are cast out from s perpendicular to the determined segment direction using the pixels of the distance cube map; this gives pairs of distances from s to the object wall. Each pair of rays is used to calculate a vector towards s. The vectors are added together and averaged. The result is then added to s to reposition it, which acts to shift s towards the centerline. Depending on the original offset of s from the centerline, it may be necessary to repeat the above steps one or more times until no further shift is indicated.

The above-described embodiments for navigating along an object may be used to navigate "on the fly" as the camera is moving, or to calculate an entire path in advance. For the second option, a plurality of segments are calculated, and then joined or connected together to form a path. Once this path is determined, image processing is performed to generate the images to be shown to the user over the whole path length, and the images are then displayed in sequence like film footage. This approach may give a smoother moving image since the various frames of the image do not need to be generated in real time as the user is watching, but there may be also be a considerable delay between the user instructing path generation and the images being ready for display, since the image rendering may be very time-consuming. Also, the process is entirely automated and does not offer any user interaction. The user is limited to passive viewing as the virtual camera flies along the path. In contrast, the "on the fly" option allows user interaction. If the direction of motion is calculated as the camera travels, with the relevant images being generated at the same time, the user can be offered the opportunity to influence the navigation en route, by selecting which way to travel if the lumen branches, or to slow down, speed up or rotate the camera according to the attention warranted by the objects in view.

To navigate on-the-fly, it is desirable for the navigation direction to be determined for a few segments ahead of the current camera position, rather than locating the camera right at the front of the navigation so far determined. This gives a little time for the images to be rendered before they need be displayed, to give a smoother viewing experience, and also allows more information to be provided to the user. The camera image displayed to the user can be accompanied by a representation of the navigation so far, or part thereof, in the form of a line on a reference view or image of the lumen. The reference view may be the virtual endoscopy or perspective view itself, a longitudinal cross-sectional image such as a curved multi-planar reformatting (MPR) image, or a three-dimensional segmented view, for example. This allows the user to see when the camera is approaching a branch in the lumen, where the user may wish to choose which branch to follow, and to see which branch the camera will follow if the user takes no action. The reference image can also act as an augmented orientation reference system for the user to compare the current view location with the surrounding anatomy.

Figure 8:
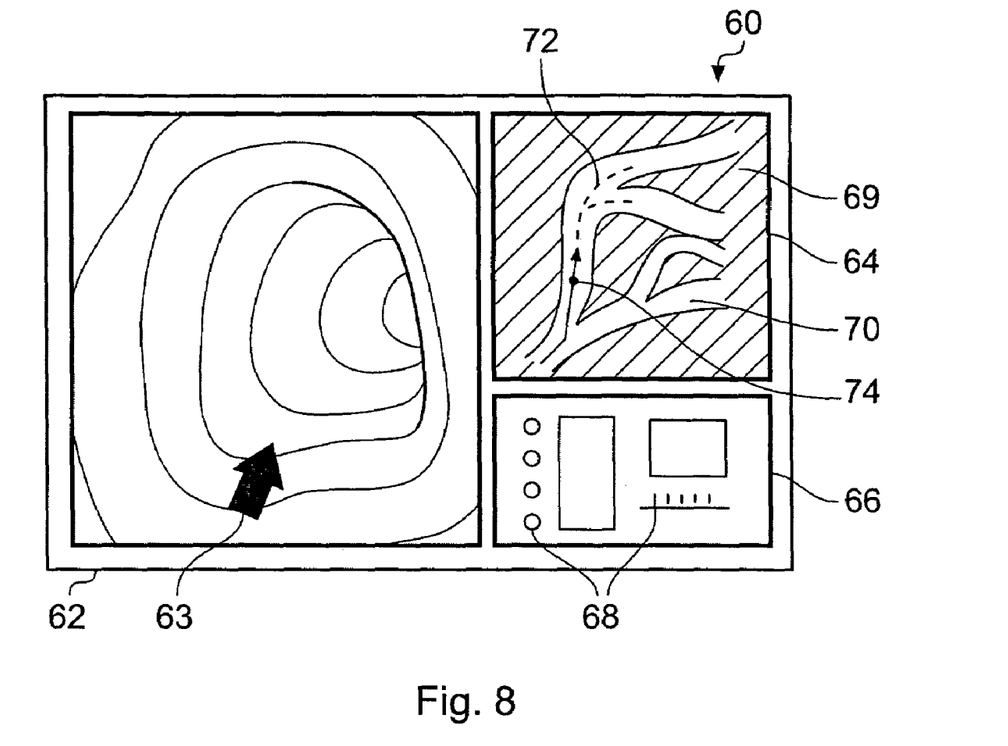
FIG. 8 shows a representation of a simple user display for a virtual endoscopy system that utilises the present invention.

FIG. 8 shows a simplified schematic representation of an example display including these features. The display will typically be shown to a user on a monitor such a computer monitor. In this example, the display 60 comprises a primary window 62 which shows the image of the lumen from the virtual camera, a secondary window 64 which shows a reference image or view 69 comprising an image of the object with the camera route superimposed, and a control panel 66 to relay other information to the user and also including various controls 68 allowing the user to operate the virtual endoscope via computer point-and-click interactivity. The camera image in the primary window has superimposed upon it an arrow 63 that indicates the direction of camera motion (as opposed to the camera view direction). The reference image 69 in the secondary window 64 shows a region of the lumen 70 through which the camera is currently travelling. The navigation direction calculated so far is shown as a line 72 along the lumen, dotted in front of the current camera position and solid behind the current camera position. The current camera position is shown by a dot 74 with an accompanying arrow to indicate the direction of travel. As the reference image shows, the camera is approaching a branch in the object, but this is obscured from the camera in its current position by a preceding bend in the lumen so does not appear in the primary window 62. However, the user can see the imminent branch on the reference image 69, and can get ready to instruct the virtual endoscope to turn into the branch if desired. A similar display can be provided to the user to allow the start point for the navigation to be selected at the beginning of the endoscopy session; the user can use a mouse to point and click to position the start point on the reference image 69.

The distance between the segments ahead of the camera position for which the navigation is calculated will depend in part on the speed at which the camera is moving, so that there is time to generate the images before the camera reaches the relevant part of the lumen. The speed of image generation therefore also affects this. It is desirable if the user is able to control the camera speed, so that more time can be spent viewing the regions of the lumen of most interest.

To enable the user to control the speed of travel of the camera, the virtual endoscopy system can include a user input device that allows the user to modify the speed, for example by keystrokes on a keyboard; button clicks, wheel clicks or wheel rotations on a mouse; or by a cursor-controlled on-screen slider or dial. The speed can be related to the navigation segments, so that the camera traverses each segment in a fixed time, or the speed can be defined in voxels per unit time. In addition to adjusting the speed, the user is advantageously able to stop the camera if a feature of particular interest comes into view or if it is decided that the navigation need not proceed further.

Whether navigation is performed on-the-fly or used to generate a path in advance of camera travel, an improved viewing experience is provided if the camera moves smoothly as it travels. Assuming for the present that the camera is not rotated by the user during travel, a convenient default arrangement is for the camera view direction (the point of view from which the images are generated) to be arranged along the direction of travel, so that the user is shown a view straight ahead down the lumen. The navigation is made up of a series of straight segments. Each new camera orientation is determined having a direction different to the direction of the previous orientation, so the view direction changes and the camera appears to the user to swing round to face the new direction. For relatively straight regions of the lumen, this will give a reasonably smooth moving image. A smoother result can be achieved by interpolating between the current navigation direction and the navigation direction a few segments ahead (say, up to five segments ahead, but the exact number chosen will depend on the length of the individual segments), and using the result as a new viewing direction for the camera. This aims to avoid sudden sharp rotations of the camera if a straight region of lumen is followed by a sharp turn.

However, it may be that for a bend in the lumen or a turn in the navigation that has very high curvature relative to the segment length, this interpolation still causes the camera to rotate too rapidly, so that the image shown to the user as the camera rotates changes too rapidly, and is therefore disorientating. This situation may be tested for by setting a threshold for camera rotation of a maximum acceptable angle of rotation per forward distance traveled or detecting a maximum angle between successive navigation segments, for example. If a sharp bend is indicated, the situation may be improved by temporarily slowing the camera's travel speed. The time set for travel along a single segment can be increased, to give more time for the camera to rotate to the interpolated direction within each segment, or alternatively this time can be kept constant and one or more extra segments can be inserted into the navigation generation by interpolating between the existing start points for each segment to provide additional points which are connected to redefine the navigation direction. The latter alternative requires more computation, but offers the advantage that the navigation is smoothed which also contributes to reducing the angles through which the camera is required to rotate.

Figure 9:
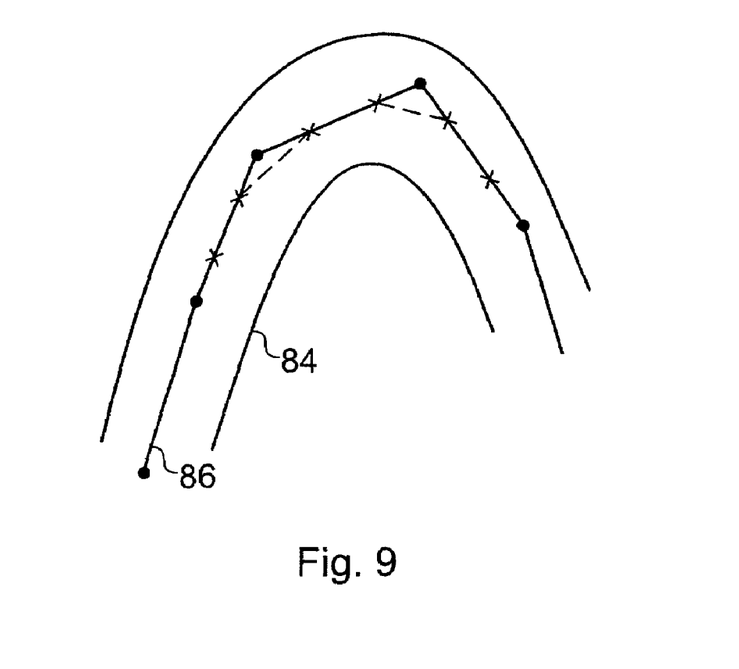
FIG. 9 shows a cross-sectional representation of part of a lumen in which navigation is being performed in accordance with an embodiment of the invention.

FIG. 9 shows a schematic cross-sectional representation of a particularly sharp bend in a lumen 84 around which a camera is navigated using relatively long navigation segments (solid lines). This gives a camera route 86 with very tight corners. Interpolating extra points (crosses) between the start and end points (dots) of the existing segments allows the route 86 to be divided into shorter segments (dotted lines) with smaller angles between the segments.

In many situations, it is highly desirable for the user to be able to rotate the camera during a virtual endoscopy fly-through. A clinician performing a diagnostic procedure may want to obtain a more detailed view of a particular item such as a suspected polyp or tumor and will hence need to direct the camera towards the item as it moves past. For on-the-fly navigation such as is offered by embodiments of the present invention, this is practicable because the navigation direction for future segments has not yet been generated so no computation is wasted if the user changes the camera view direction.

The fly-through may begin with a camera view direction in the direction of travel (navigation direction). If the user wishes to rotate the camera, he can input an instruction to the virtual endoscopy system. The navigation direction continues to be determined as usual, with the camera moving forwards along the navigation direction, but the camera itself is rotated so that its view direction is no longer along the travel direction. Images for display to the user are generated accordingly. The system may be arranged so that the camera stays in its rotated orientation until the user enters a further command to change to a new rotation or to return the view direction to the travel direction. Alternatively, in the absence of a further user command within a set time period, the camera may automatically rotate back to realign the view direction with the travel direction.

In these examples, the camera view direction is wholly separate from the camera travel direction, which matches the navigation direction. However, further user interaction can be provided by offering the user the facility to couple or decouple the two directions by inputting instructions to the system. When decoupled, the camera continues to travel along navigation directions calculated using the longest average ray length, while being freely rotatable with respect to the navigation direction by the user. In this case, the user is not controlling the navigation direction in any way, only the camera direction. When the two directions are coupled, the camera looks forward along the navigation direction, which is a useful default arrangement when the user does not wish to rotate the camera, but which can be deactivated to allow the user to rotate the camera, and also to control the navigation in real time. If the user sees a branch in the lumen ahead, he can decouple the directions to rotate the camera to look into one or other branch as the camera approaches, and if he wishes the camera to turn into that branch, he can recouple the directions so that the viewing direction is used as a weighting factor to determine the segment direction as described above with respect to FIG. 7B.

A particular advantage of the embodiments of the present invention in which the camera navigation is calculated on-the-fly is that it can be used for virtual endoscopy not only in the three-dimensional volume data sets discussed so far, but also in four-dimensional data sets. The fourth dimension is time, so that the data set represents a three-dimensional moving object. This may also be thought of as a time-evolving three-dimensional data set. Thus, the virtual camera can fly through a data set representing a beating heart, or can be used for an endoscopic examination of a patient in real time, to accommodate breathing or other patient movements during the imaging process. This is made possible because the navigation need only be calculated a few segments ahead of the camera position, so that any subsequent movement of parts of the lumen not yet traveled is not relevant to the navigation calculation. Clearly, navigation techniques in which a complete path is calculated in advance of the camera image generation cannot readily be used with a four-dimensional data set, particularly techniques that require the path start and end points to be fixed in advance relative to the whole data set.

The various embodiments of the present invention are applicable to any lumen navigation problem for a three- or four-dimensional data set obtained by medical imaging. The terms object and lumen are intended to have wide coverage, and apply generally to any biological hollow tubular object within the human or animal body. The object may be branched, for example, the bronchial network or the circulatory system (aorta, veins, arteries), or non-branched, for example the colon or esophagus. Indeed, the invention is also applicable to any navigation problem where a "flight" through a hollow tubular object or network (biological or otherwise) is desired, and where the object is suitable for imaging using a technique that provides a three-dimensional volume data.

A number of medical applications depend upon navigating through lumens imaged in volume data sets, and the present invention is applicable to all such applications. The navigation technique described may be applied to determine the precise location of and distance to an operation site (tumor removal, for example), so that a surgeon can plan the operation very precisely. The best incision site can be accurately located, for example. A further important application is curved multi-planar reformatting (MPR), which is an imaging technique used to provide a two-dimensional image of a curved and hence three-dimensional biological object. A path or three-dimensional curve is defined through the three-dimensional data set along the length of the object. The curve is extruded in a desired direction to generate a curtain-like sheet in the three-dimensional volume, and the sheet is then flattened and presented to the user as a two-dimensional image.

It is expected that the present invention will be implemented using a computer system with appropriate software, the system comprising a memory to hold the three-dimensional volume data set, and a processor programmed with the software and operable to implement the navigation, and other image processing and data processing. A monitor is provided to display the data set once it is rendered as a three-dimensional or two-dimensional image (the view presented by a virtual endoscopy camera, or a curved MPR image, for example), as are user input devices such as a keyboard and a mouse. The user may select the start point (and possibly but not necessarily an end point) for the desired navigation using the user input devices, or the software may be able to perform this automatically by identifying the extent of an object of interest according to its characteristic range of voxel values. Further in this regard, a computer program product may be made available to implement the present invention, comprising instructions readable by a machine such as a computer and operable to instruct the machine to navigate along an object in accordance with the invention. The computer program product may have the form of a computer program on a carrier medium, where the carrier medium is a storage medium or a transmission medium.

For use in a hospital environment, a computer system that implements the invention may usefully be integrated with a Picture Archiving and Communication System (PACS). This is a hospital-based computerised system which can store diagnostic images of different types (including three-dimensional volume data sets from CT, MRI, PET and ultrasound) in a digital format organised in a single central archive. Each image has associated patient information such as the name and date of birth of the patient also stored in the archive. The archive is connected to a computer network provided with a number of workstations, so that users all around the hospital site can access and view any image data as needed. Additionally, users remote from the site may be permitted to access the archive over the internet or a wide area network.

In the context of the present invention, therefore, a plurality of volume data sets can be stored in a PACS archive, and a computer-implemented method of navigating along a biological object represented by a volume data set according to embodiments of the invention can be provided on a workstation connected to the archive via a computer network. A user such as a radiologist, a consultant, or a researcher can thereby access any volume data set from the workstation, and navigate through the data for the purpose of a virtual endoscopic procedure, MPR image display, or similar. The navigation may be performed on a local processor comprised within the workstation, or on a central processor located elsewhere in the network that then generates the images and sends them to a monitor of the workstation for display to the user.

Figure 10:
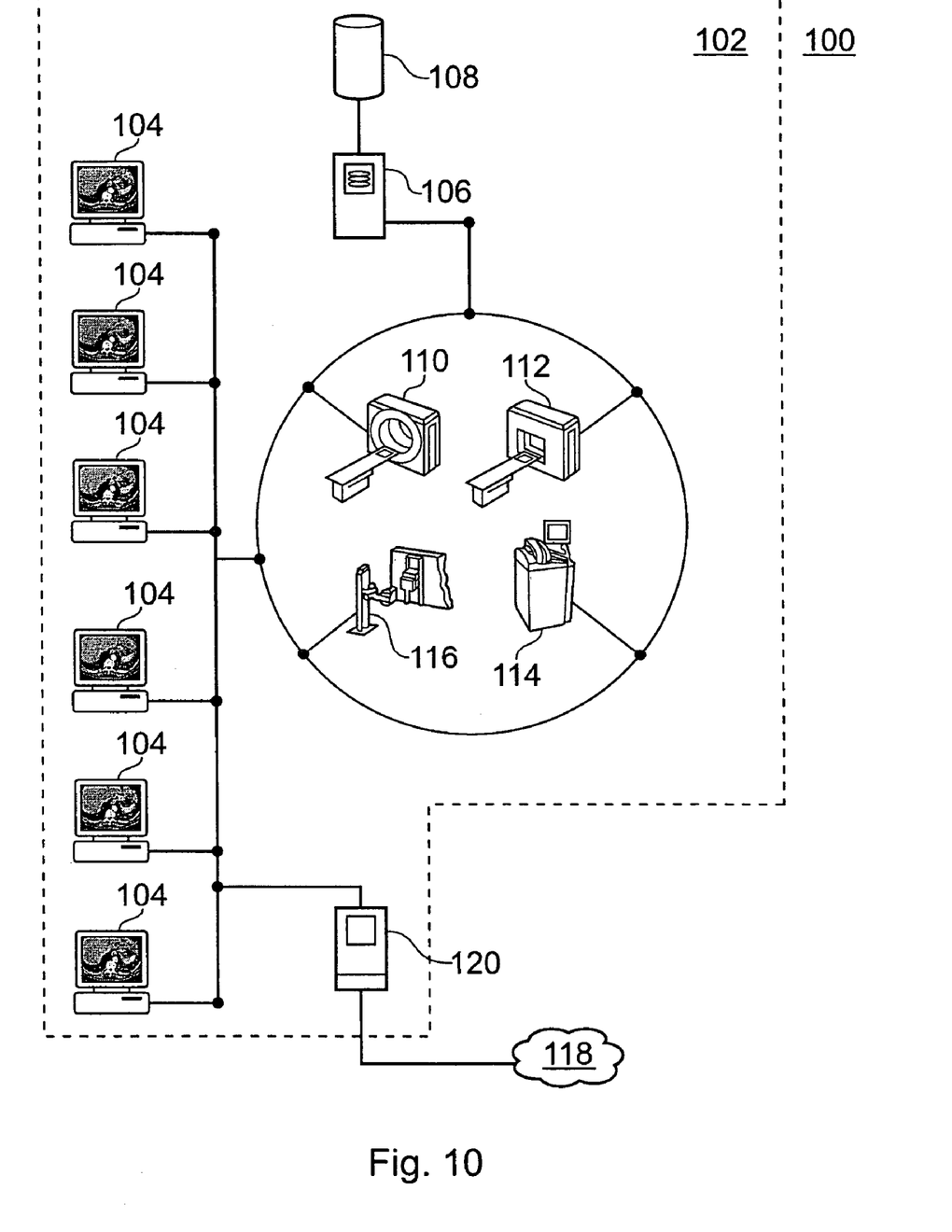
FIG. 10 shows an example computer network that can be used in conjunction with embodiments of the invention.

FIG. 10 shows an example computer network which can be used in conjunction with embodiments of the invention. The network 100 comprises a local area network in a hospital 102. The hospital 102 is equipped with a number of workstations 104 which each have access, via the local area network, to a hospital computer server 106 having an associated storage device (memory) 108. A PACS archive is stored on the storage device 108 so that data in the archive can be accessed from any of the workstations 104. One or more of the workstations 104 has access to software for computer-implementation of methods of navigation as described above. The software may be stored locally at the or each workstation 104, or may be stored remotely and downloaded over the network 100 to a workstation 104 when needed. In another example, methods embodying the invention may be executed on the computer server 106 with the workstations 104 operating as terminals. A number of medical imaging devices 110, 112, 114, 116 are connected to the hospital computer server 106. Volume data collected with the devices 110, 112, 114, 116 can be stored directly into the PACS archive on the storage device 106. Thus a virtual endoscope camera navigation or path for another patient imaging technique may be generated immediately after the corresponding volume data set is recorded, so that a swift diagnosis can be obtained in the event of a medical emergency. The local area network 100 is connected to the Internet 118 by a hospital internet server 120, which allows remote access to the PACS archive. This is of use for remote accessing of the data and for transferring data between hospitals, for example, if a patient is moved or to allow external research to be undertaken.

It will be appreciated that although particular embodiments of the invention have been described, many modifications, additions and/or substitutions may be made within the scope of the present invention. Accordingly, the particular examples described are intended to be illustrative only, and not limitative.

REFERENCES

[1] U.S. Pat. No. 5,971,767
[2] U.S. Pat. No. 6,496,188
[3] U.S. Pat. No. 6,343,936
[4] U.S. Pat. No. 5,611,025
[5] US 2005/0033114
[6] WO 03/054803
[7] U.S. Pat. No. 5,782,762
[8] U.S. Pat. No. 6,083,162
[9] US 2004/0202990
[10] D Bartz, "Virtual endoscopy in research and clinical practice", STAR—State of the Art Report, Eurographics 2003, The Eurographics Association

What is claimed is:

1. A computer-implemented method of navigating along a hollow tubular object bounded by a wall and represented by a three-dimensional volume data set, the data set comprising a plurality of voxels arranged in a three-dimensional array, the method comprising:

generating a plurality of navigation segments connectable in a sequence, each segment having a start point within the object, a direction and a length; the direction of each segment being determined by:

calculating an average ray length for each of two or more groups of rays cast from the start point of the segment and that have a different direction, each group comprising a plurality of rays arranged about a central axis, and each ray extending from the start point to the wall;

selecting the group with the largest average ray length; and setting the direction of the segment to the direction of the central axis of the selected group.

2. The method of claim 1, wherein the plurality of rays in each group are cast within a solid angle.

3. The method of claim 2, wherein the plurality of rays in each group are cast within a cone.

4. The method of claim 1, wherein the method further comprises, for each navigation segment:

defining a surface within the data set that encloses the start point;

dividing the surface into a plurality of pixels; and for each pixel, casting a ray in the direction of the pixel from the start point to the wall and allocating to the pixel a value representing the length of the ray; and calculating an average ray length for a group of rays comprises:

selecting a group of adjacent pixels arranged about a central pixel; and calculating the average pixel value for the group of pixels;

where the average pixel value for the group of pixels corresponds to the average ray length of the group of rays, and the direction of the central pixel from the start point corresponds to the direction of the central axis of the group of rays.

5. The method of claim 4, wherein the surface is the surface of a cube comprising six square faces.

6. The method of claim 5, wherein the group of adjacent pixels is arranged in a circle, to approximate to a group of rays cast within a cone.

7. The method of claim 5, wherein each face of the cube is extended past the edges of the cube by adding pixels with values that match the values of pixels in proximate regions of the adjacent faces, to accommodate groups of pixels with central pixels near the edge of a face.

8. The method of claim 4, and further comprising, for at least one navigation segment, adjusting the start point towards the central longitudinal axis of the object using the values of the pixels on the surface.

9. The method of claim 1, wherein the average ray length is a weighted average ray length.

10. The method of claim 9, wherein the average ray length is weighted with the dot product of a vector describing the direction of the central axis of the group of rays and a vector derived from the direction of one or more previous navigation segments in the sequence.

11. The method of claim 9, wherein the navigation segments are used to navigate a virtual camera along the object, the camera having a view direction, and wherein the average ray length is weighted with the dot product of a vector describing the central axis of the group of rays and a vector describing the view direction of the camera.

12. The method of claim 9, wherein the navigation segments are used to navigate a virtual camera along the object, the camera having a view direction, and the method further comprising, after calculating the weighted average ray length for each group of rays, calculating a score for each group of rays based on the weighted average ray length and on the direction of the central axis relative to the direction of a previous navigation segment and to a previous or current viewing direction, and wherein selecting the group with the largest average ray length comprises selecting the group with the best score.

13. The method of claim 1, further comprising causing a virtual camera to travel along the navigation segments in sequence such that an image of the interior of the object from a point of view of the travelling camera is displayed to a user.

14. The method of claim 13, wherein one or more navigation segments are generated ahead of a current position of the camera.

15. The method of claim 14, wherein if the directions of two navigation segments are found to have an angular difference that exceeds a specified threshold, one or more intermediate navigation segments are generated by interpolating between the two navigation segments, and inserted in sequence between the two navigation segments to reduce the rate of angular change.

16. The method of claim 14, wherein, for at least some navigation segments, the camera has a view direction which is described by the direction of the navigation segment along which the camera is travelling.

17. The method of claim 14, wherein, for at least some navigation segments, the camera has a view direction interpolated from the direction of the navigation segment along which the camera is travelling and the direction of a navigation segment ahead of the navigation segment along which the camera is travelling.

18. The method of claim 17, wherein the view direction of the camera is rotated towards the interpolated direction as the camera travels along the navigation segment.

19. The method of claim 14, wherein the camera has a view direction that can be rotated by a user.

20. The method of claim 19, wherein a navigation segment can be selected by a user to have a direction substantially along the view direction of the camera.

21. The method of claim 20, wherein, for the selected navigation segment, the method further comprises weighting the average ray length for each group of rays with the dot product of a vector describing the central axis of the group of rays and a vector describing the view direction of the camera, before selecting the group with the largest weighted average ray length.

22. The method of claim 13, further comprising displaying to a user a reference view of the object including an indication of the current camera position.

23. The method of claim 21, wherein the reference view further includes a representation of one or more navigation segments.

24. The method of claim 22, wherein the reference view further includes, at a branch in the object, representations of navigation segments with different directions between which a user can choose.

25. The method of claim 13, wherein the image of the interior of the object includes an indication of the direction of travel of the camera.

26. The method of claim 13, wherein the camera travels at a velocity that can be adjusted by a user.

27. The method of claim 1, and further comprising, for at least one navigation segment, adjusting the start point towards the central longitudinal axis of the object.

28. The method of claim 1, wherein the three-dimensional volume data set is a time-evolving three-dimensional volume data set so that the navigation traverses the object in space and time.

29. The method of claim 1, further comprising connecting the navigation segments in sequence to create a path through the object.

30. The method of claim 29, further comprising, after creating the path, causing a virtual camera to travel along the path such that an image of the interior of the object from a point of view of the travelling camera is displayed to a user.

31. The method of claim 29, further comprising using the path for a purpose other than navigation of a virtual camera.

32. The method of claim 1, in which the hollow tubular object is a biological object with a lumen.

33. A computer program product comprising machine-readable instructions for implementing a computer-implemented method of navigating along a hollow tubular object bounded by a wall and represented by a three-dimensional volume data set, the data set comprising a plurality of voxels arranged in a three-dimensional array, the instructions being operable to instruct a machine to:
  store a three-dimensional volume data set; and
  generate a plurality of navigation segments connectable in a sequence, each segment having a start point within the object, a direction and a length; the direction of each segment being determined by:
    calculating an average ray length for each of two or more groups of rays cast from the start point of the segment and that have a different direction, each group comprising a plurality of rays arranged about a central axis, and each ray extending from the start point to the wall;
    selecting the group with the largest average ray length; and
    setting the direction of the segment to the direction of the central axis of the selected group.

34. The computer program product of claim 33, comprising a computer program product on a carrier medium.

35. A computer system for implementing a computer-implemented method of navigating along a hollow tubular object bounded by a wall and represented by a three-dimensional volume data set, the data set comprising a plurality of voxels arranged in a three-dimensional array, the computer system comprising:
  memory for storing a three-dimensional volume data set; and
  a processor programmed to:
    generate a plurality of navigation segments connectable in a sequence, each segment having a start point within the object, a direction and a length; the direction of each segment being determined by:
      calculating an average ray length for each of two or more groups of rays cast from the start point of the segment and that have a different direction, each group comprising a plurality of rays arranged about a central axis, and each ray extending from the start point to the wall;
      selecting the group with the largest average ray length; and
      setting the direction of the segment to the direction of the central axis of the selected group.

* * * * *

UNITED STATES PATENT AND TRADEMARK OFFICE
CERTIFICATE OF CORRECTION

PATENT NO. : 7,623,900 B2 Page 1 of 1
APPLICATION NO. : 11/219632
DATED : November 24, 2009
INVENTOR(S) : Graham et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1116 days.

Signed and Sealed this

Twenty-sixth Day of October, 2010

David J. Kappos
*Director of the United States Patent and Trademark Office*